April 29, 1930. P. B. CHOJNACKI ET AL 1,756,239
TRAILER
Filed Feb. 12, 1929
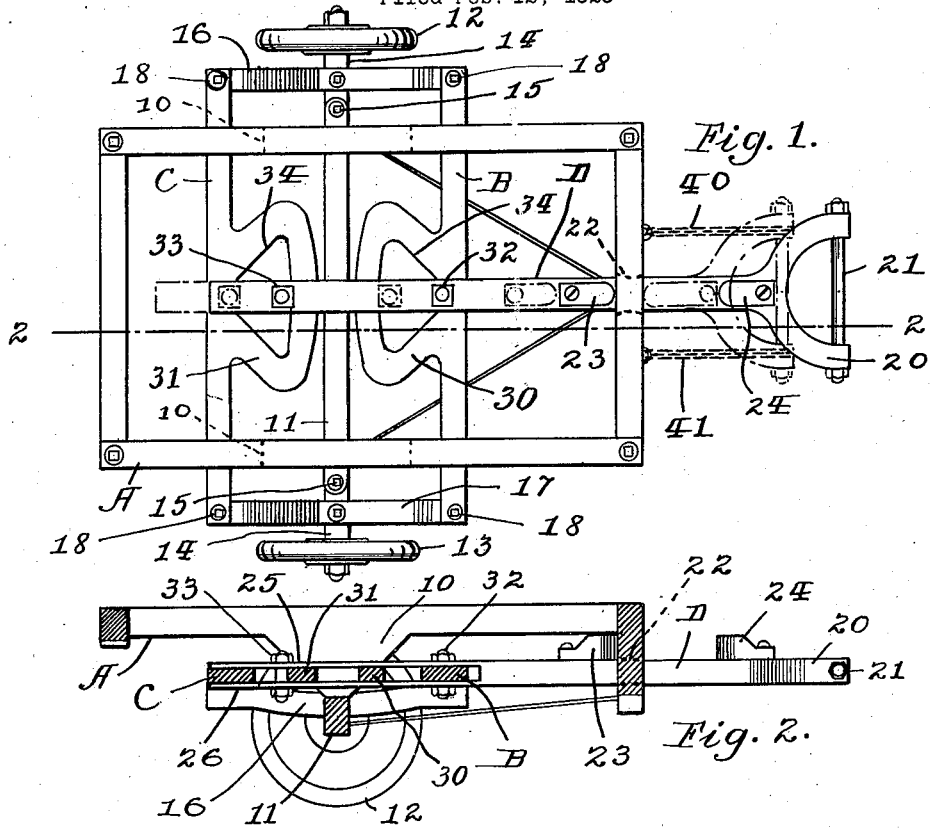
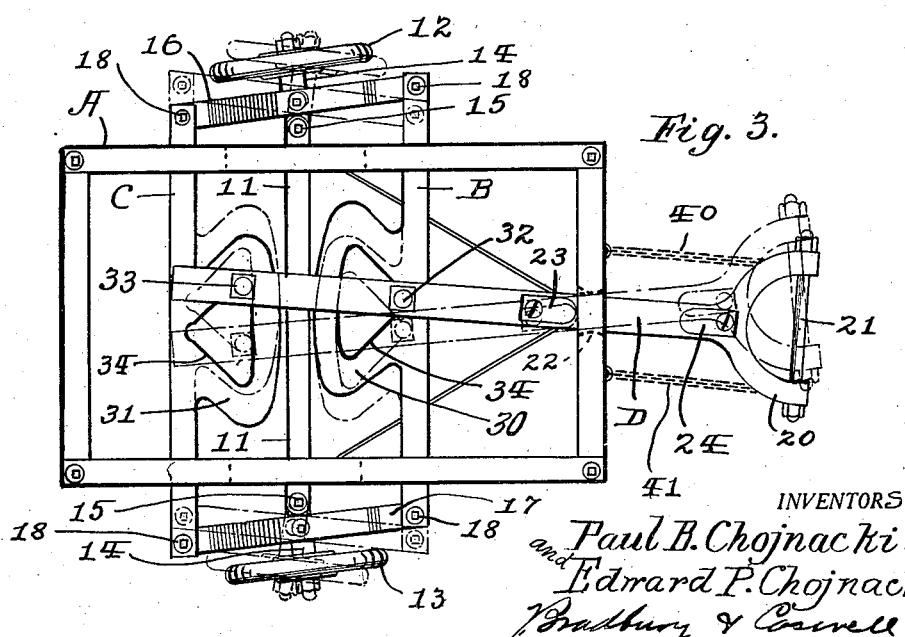
INVENTORS:
Paul B. Chojnacki,
and Edward P. Chojnacki
Bradbury & Coswell
ATTORNEYS.

Patented Apr. 29, 1930

1,756,239

UNITED STATES PATENT OFFICE

PAUL B. CHOJNACKI AND EDWARD P. CHOJNACKI, OF LOS ANGELES, CALIFORNIA

TRAILER

Application filed February 12, 1929. Serial No. 339,306.

This invention relates to a two wheel trailer which is adapted to be hitched to a motor vehicle or other drawing unit by means of a draw-bar, said draw-bar being freely coupled to said vehicle and incorporated into the structure of the trailer in a novel manner so that the trailer will be steered automatically and made to follow substantially in the track of the vehicle when traveling straight or turning in a forward or backward direction.

The invention consists in certain novel combinations and arrangements of parts as will be hereinafter more specifically set forth and claimed.

In the accompanying drawing forming part of this specification, Fig. 1 is a plan of the chassis of our improved trailer showing our invention with the draw-bar in position when the trailer is being drawn straight ahead, the broken line position indicating the position assumed by the draw-bar when the trailer is backed; Fig. 2 is a section taken on the line 2—2 of Fig. 1, and Fig. 3 is a plan when the trailer is turning in one direction, the broken line position showing the draw-bar when the turning direction is reversed.

In the drawing A indicates a rectangular body frame of any common or preferred construction which is supported at each side by the pilaster 10, rigidly secured to an axle 11. This manner of securing the body frame to the axle may be varied as preferred, within the spirit of our invention. The pair of wheels 12 and 13 is mounted by journals in the usual manner upon steering knuckles 14, said knuckles being pivoted to opposite ends of the axle to swing on vertical axes 15. Each steering knuckle has a pair of forwardly and rearwardly extending steering arms 16 and 17 of corresponding length and the outer extremities of the corresponding arms are connected by tie members B and C, the ends of which are pivoted at 18 to the steering arms. In this manner the wheels are guided simultaneously whenever any of the steering arms are impelled by either of the tie members.

D indicates a draw-bar which has the usual coupling 20 at its forward end and coupling pin 21 by which the trailer can be detachably coupled to a vehicle to be drawn thereby. This draw-bar has limited longitudinal and pivotal movement in the forward end at 22 of the body frame, a suitable opening in the body frame being provided through which the draw-bar passes and a pair of shoulder members 23 and 24 fastened to the draw-bar and allowing limited longitudinal sliding movement through said opening. The swinging movement of the draw-bar is substantially in a horizontal plane. The body of the draw-bar is split horizontally into two upper and lower side members 25 and 26 for purposes to be hereinafter described.

The tie elements are substantially parallel and have cam members 30 and 31 lying substantially in a horizontal plane and with which the draw-bar co-operates through cam engaging elements 32 and 33. Each cam element has an internal cam surface 34, resembling a triangle, the apex end of which in the case of the forward cam faces forwardly and in the case of the rear cam faces rearwardly. The cam elements are slidably engaged between the upper and lower sides 25 and 26 of the draw-bar by the cam engaging elements 32 and 33 which resemble bolts fastened to the draw-bar and passing through the cams. These cam engaging elements are spaced so that during forward pull upon the draw-bar the forward cam engaging element 32 engages the forward cam surface in its apex causing the steering levers 16 and 17 to steer the wheels and cause them to follow in the track of the pulling vehicle to which the draw-bar may be attached. During this movement the rear cam engaging element 33 is free to swing around the base of the triangular shaped cam surface, sufficient length being provided to permit such movement. Reverse or backing movement upon the draw-bar frees the cam engaging element 32 from the forward cam apex and causes the rear cam engaging element to guide along one or the other of the sides of the rear cam surface according to the angle of the draw-bar, into engagement with the apex of the rear cam, in which position the draw-bar, during its backward thrust will direct the wheels in a similar manner as by a pulling force. A reverse movement of the draw-bar while in median position, that is while pulling or backing in a direct line causes the cam engaging elements to move from engagement with the apex of one cam into engagement with the apex of the other cam. Likewise when changing from a forward pull upon the draw-bar to a backing movement and vice-versa, the wheels are caused to straighten and travel in a direct path. During these changes the draw-bar has free sliding movement in the passage 22 of the body frame and fulcrums on said frame to cause through co-action with the cams the steering action of the wheels.

While the draw-bar is in median position the shoulder member 23 engages the body frame to relieve the pulling strain of the draw-bar upon the forward cam and the shoulder member 24 engages the body frame to relieve the backing strain of the draw-bar upon the rear cam. Chains 40 and 41 attached between the coupling and body frame are of such length as to relieve excessive strain sidewise upon the draw-bar and cams.

In operation swinging motion of the draw-bar is immediately transmitted to the wheels so that even slight movement of the draw-bar finds immediate response in the wheels for steering purposes. At the same time the moving parts are firmly bound together so that there is no looseness or uneffective motion between any two parts, and therefore any pounding or shock to the parts is eliminated and a substantially noiseless, durable construction is provided. Further the construction is exceedingly simple and strong and not liable to get out of order.

In accordance with the patent statutes, we have described the principles of operation of our invention, together with the construction which we now consider to represent the best embodiment thereof but we desire to have it understood that the construction shown is only illustrative and that the invention can be carried out by other means and applied to uses other than those above set forth within the scope of the following claims.

Having described our invention what we claim as new and desire to secure by Letters Patent is:

1. A two wheel trailer, comprising, in combination, a trailer body frame having an axle, steering knuckles pivoted upon the ends of said axle, each having a pair of forward and rear steering arms, wheels journaled upon said steering knuckles, a pair of tie elements one pivotally securing the pair of forward steering arms and the other securing the pair of rear steering arms whereby the steering arms are operated in unison to guide the steering wheels, said tie elements having forward and rear cam operating elements, and a draw bar slidably fulcrumed upon said body frame and having cam engaging elements adapted to transmit steering movement to said wheels through said cam engagement and the sliding and swinging movement of the draw-bar.

2. A two wheel trailer, comprising, in combination, a trailer body frame having an axle, steering knuckles pivoted upon the ends of said axle, each having a pair of forward and rear steering arms, wheels journaled upon said steering knuckles, a pair of tie elements one pivotally securing the pair of forward steering arms and the other securing the pair of rear steering arms, whereby the steering arms are operated in unison to guide the steering wheels, said tie elements having forward and rear cam operating elements, and a draw bar slidably fulcrumed upon said trailer frame and having separate cam engaging elements, one engaging the forward cam operating element to steer the wheels in a forward direction and the other engaging the rear cam operating element to steer the wheels in a backward direction.

3. A two wheel trailer, comprising, in combination, a body frame having an axle, steering knuckles pivoted upon the ends of said axle having steering arms, carrying wheels journaled upon said knuckles, a tie element securing the steering arms whereby the steering arms are operated in unison to guide the steering wheels, said tie element having a cam operating element, and a draw bar slidably fulcrumed upon said body frame and having a cam engaging element adapted to assist in transmitting steering movement to said wheels through the movement of said draw-bar.

4. A two wheel trailer, comprising, in combination, a body frame having an axle, steering knuckles pivoted upon the ends of said axle each having a pair of forward and rear steering arms, wheels journaled upon said knuckles, forward and rear tie elements pivotally securing the pair of forward steering arms and the pair of rear steering arms whereby the steering arms are operated in unison to steer said wheels, said tie elements having forward and rear cam operating elements, said forward cam operated element having an internal cam surface with forwardly converging guide faces and said rear cam operated element having an internal cam surface with rearwardly converging guide faces, and a draw-bar slidably fulcrumed upon said body frame and having two separate cam engaging elements one guided by said forwardly converging guide faces and engaging the forward cam operated element in its apex when the draw-bar assumes forward position to steer the wheels in a forward direction and freely disposed to move backward with the draw-bar, and the other guided by said rearwardly converging guide faces and engaging the rear cam operated element in its apex when the draw-bar assumes rear position to steer the wheels in a backward direction and freely disposed to move forwardly with the draw-bar.

In testimony whereof we have signed our names to this specification.

PAUL B. CHOJNACKI.
EDWARD P. CHOJNACKI.